United States Patent [19]
Braschel et al.

[11] Patent Number: 5,251,970
[45] Date of Patent: Oct. 12, 1993

[54] METHOD OF CONTROLLING THE BRAKE PRESSURE IN AN ANTI-LOCK VEHICLE BRAKE SYSTEM

[75] Inventors: Volker Braschel; Dieter Seitz, both of Neuwied, Fed. Rep. of Germany

[73] Assignee: Lucas Industries public limited company, Birmingham, England

[21] Appl. No.: 688,539

[22] Filed: Jun. 20, 1991

[30] Foreign Application Priority Data

Nov. 2, 1989 [DE] Fed. Rep. of Germany ....... 3936510

[51] Int. Cl.⁵ .............................................. B60T 8/32
[52] U.S. Cl. ..................... 303/105; 303/95; 303/97
[58] Field of Search ..................... 303/95, 96, 97, 100, 303/105, 106, 110

[56] References Cited

U.S. PATENT DOCUMENTS

| | | | |
|---|---|---|---|
| 3,857,612 | 12/1974 | Bynum | 303/105 |
| 3,936,941 | 2/1976 | Hiscox | 303/105 |
| 4,701,855 | 10/1987 | Fennel | 303/105 |
| 4,900,099 | 2/1990 | Braschel | 303/95 |
| 4,923,255 | 3/1990 | Braschel et al. | 303/105 X |
| 4,991,910 | 2/1991 | Shimanuki et al. | 303/105 X |

FOREIGN PATENT DOCUMENTS

| | | |
|---|---|---|
| 198691 | 10/1986 | European Pat. Off. . |
| 329071 | 8/1989 | European Pat. Off. . |
| 334275 | 9/1989 | European Pat. Off. . |
| 338414 | 10/1989 | European Pat. Off. . |
| 2741377 | 3/1978 | Fed. Rep. of Germany ...... 303/109 |
| 01-36362 | 5/1990 | Japan .................................... 303/105 |
| 8802709 | 4/1988 | World Int. Prop. O. . |

OTHER PUBLICATIONS

Western Electric Technical Digest No. 41, Jan. 1976, by S. J. Vahaviolos.

*Primary Examiner*—Matthew C. Graham
*Attorney, Agent, or Firm*—Oblon, Spivak, McClelland, Maier & Neustadt

[57] ABSTRACT

A method of controlling the brake pressure in an anti-lock vehicle brake system provides for short distances to stop to be reached even with greatly differing mass moments of inertia by calculating the pressure reduction period of a control cycle currently under way as the product of a first factor and a second factor. The first factor depends on the pressure reduction period in the preceding control cycle, and the second factor depends on the maximum re-acceleration of the wheel in the preceding control cycle.

8 Claims, 3 Drawing Sheets

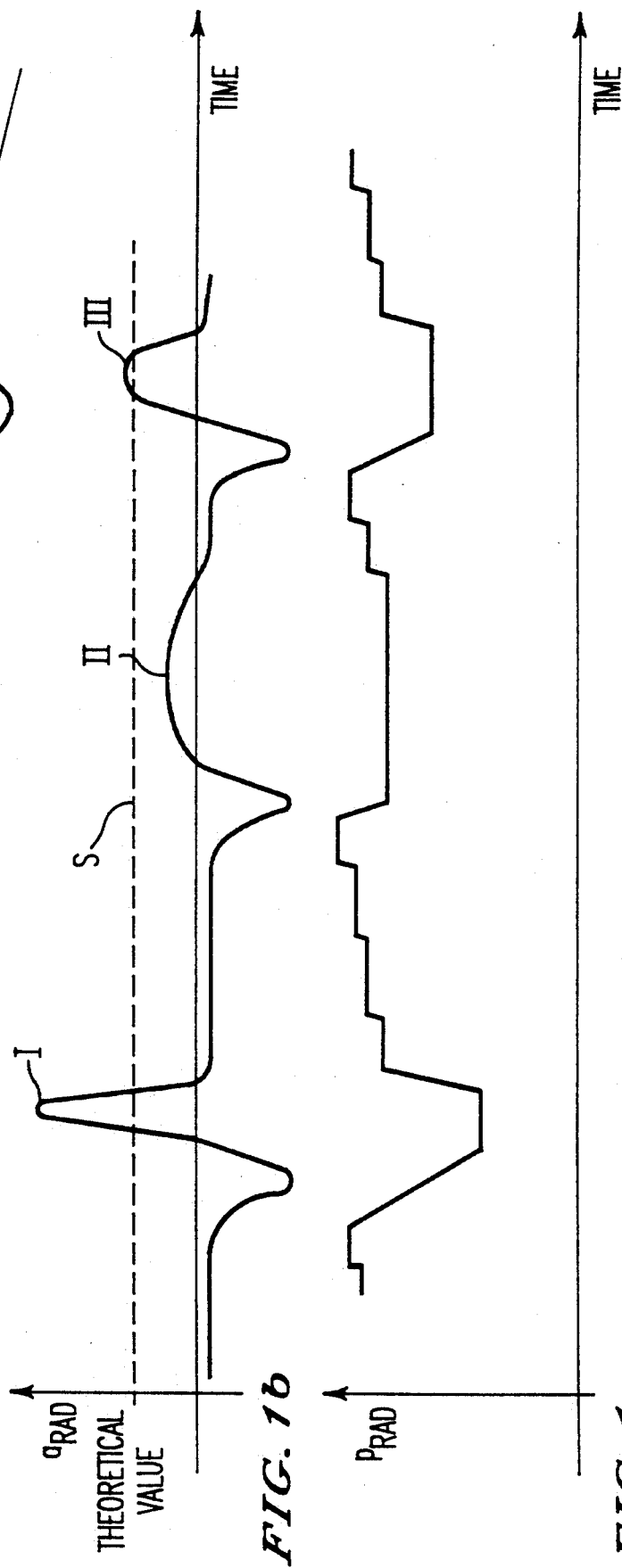

METHOD OF CONTROLLING THE BRAKE PRESSURE IN AN ANTI-LOCK VEHICLE BRAKE SYSTEM

FIELD OF INVENTION

The invention relates to a method of controlling the brake pressure in an anti-lock vehicle brake system, comprising the features recited in the preamble of claim 1.

DESCRIPTION OF THE PRIOR ART

During a braking operation under anti-lock control the rotational speed of a braked wheel is measured and the brake pressure reduced at the respective wheel, if the deceleration and/or slip of the wheel exceed predetermined threshold values, so that it will again pick up speed in order to get from the so-called instable range of the coefficient of friction/slip curve which includes the risk of locking, into the stable range of that curve.

Various criteria are known in the art for determining the point in time at which to end the brake pressure reduction. Thus it was proposed, for instance, to stop the pressure reduction when the wheel circumference acceleration reaches a predetermined value (e.g. $-1$ g). According to another known solution the pressure reduction is stopped when the wheel circumference retardation does not become greater any more (turning point). According to a third known solution the pressure reduction is stopped when the decrease of the wheel circumference acceleration or deceleration reaches a predetermined value.

These known solutions, however, raise problems particularly on roads having a very high coefficient of friction because the so-called dead or idle times (detecting the number of revolutions of the wheels, calculating the valve control signals, and switching times of the magnetic valves) result in a rather long pressure reduction or in the completion of the pressure reduction coming too late so that distance to stop is given away (so-called under-braking). On roads with a low coefficient of friction, on the other hand, the solutions mentioned above provide too little pressure reduction if it is terminated already at $-1$ g, for example.

It is likewise known in the art to set fixed time periods for the pressure reduction and have them followed by a fixed holding period after which the pressure reduction is continued. Yet this method entails a great so-called control deviation if the first pressure reduction was insufficient to bring the wheel back into the stable range of the coefficient of friction/slip curve. That is true in particular with low coefficients of friction since the duration of the first pressure reduction must be selected such that under-braking will not occur at a high coefficient of friction.

At high coefficients of friction (good road conditions), therefore, too much under-braking (giving away distance to stop) can be avoided only by completing the brake pressure reduction relatively soon. Premature termination of the pressure reduction, however, has the disadvantage in the prior art that the control deviations (variations of brake pressure) are rather low at an increasing mass moment of inertia and there is a risk that the wheels turn too long at high slip or even become locked at an early stage.

As explained above, braking under anti-lock control depends on the mass moment of inertia. The system composed of brake and vehicle may have greatly varying mass moments of inertia which depend especially on whether a light metal or steel rim is used, whether the wheel diameter is great or small, whether the braked wheel is driven, whether the vehicle drive is engaged or not, in which gear the vehicle is driven, and whether all the wheels are coupled.

SUMMARY OF THE INVENTION

It is the object of the invention to devise a method of controlling the brake pressure in an anti-lock vehicle brake system which will provide a short distance to stop, at good steerability of the vehicle, even if the mass moments of inertia vary greatly. The method is to provide good braking performance both at low and good coefficients of friction as well as with quick changes between loading and unloading of the wheel. Under-braking is to be prevented.

The solution according to the invention to meet that object provides to calculate the pressure reduction period of a control cycle currently under way as the product of a first factor which depends on the pressure reduction period in the preceding control cycle and at least a second factor which depends on the maximum re-acceleration in the preceding control cycle of the wheel.

The pressure reduction period in the very first control cycle (for which there is no preceding control cycle) is determined and measured in conventional manner by slip and/or deceleration threshold values being exceeded with respect to the braked wheel. The value measured for the pressure reduction period is stored in the computer and serves as the basis for dimensioning the pressure reduction period in the next control cycle.

In accordance with a preferred and especially simple embodiment of the invention the first factor is the pressure reduction period in the preceding control cycle itself. As an alternative to this solution, the first factor may be determined quite generally in response to the pressure reduction period in the preceding control cycle, e.g. by having this pressure reduction period of the preceding control cycle, multiplied by a certain multiplicator (weight factor), included in the final result for the pressure reduction period of the control cycle currently under way.

In a preferred simple modification of the invention the second factor which is dependent on the maximum re-acceleration of the wheel in the preceding control cycle results as the quotient of a given value and the maximum re-acceleration of the wheel measured in the preceding control cycle.

Thus the pressure reduction period according to the invention results in accordance with the following equation:

$$t_{ab}^n = t_{ab}^{n-1} \times \frac{\text{peak-soll}}{\text{peak}_{n-1}}$$

wherein $t^n_{ab}$ is the pressure reduction period in the control cycle (n) currently under way $t^{n-1}_{ab}$ is the pressure reduction period in the preceding control cycle (n−1)

peak-soll is a predetermined value (if desired, as a function of certain parameters, see below) and $\text{peak}_{n-1}$ is the maximum re-acceleration of the braked wheel in the preceding control cycle (n−1).

Thus the pressure reduction period for a control cycle currently under way always is calculated anew, according to the invention. The starting base for that calculation are data which were measured in the preceding control cycle, namely on the one hand the pressure reduction period in the preceding control cycle and, on the other hand, the maximum re-acceleration of the wheel in the preceding control cycle. If the maximum re-acceleration in the preceding control cycle was relatively small, then the pressure reduction period in the control cycle currently under way becomes relatively great compared to the pressure reduction period in the preceding control cycle. Inversely, if the re-acceleration of the wheel in the preceding control cycle was rather great, then the pressure reduction period in the control cycle currently under way becomes rather small compared to the pressure reduction period in the preceding control cycle.

The above describes the basics and the principal control parameters of the braking algorithm. Under certain circumstances the invention provides for refinement and modifications of the basic algorithm according to preferred embodiments. According to a preferred variant of the invention, for instance, the pressure reduction period of a control cycle currently under way is extended as compared to the time period resulting from the above mentioned two factors if the deceleration and/or slip of the braked wheel become greater than given threshold values. The fact that the predetermined threshold values are exceeded is an indication of the risk of the wheel running into a particularly unstable state so that it is advantageous to extend the pressure reduction period in the instantaneous cycle. The degree of deceleration and/or slip of the wheel may be measured and the extension of the pressure reduction period effected in proportion to the measurement values. For example, the pressure reduction period may be extended by one millisecond per 2 km/h slip or per 2 g wheel circumference deceleration, each above a predetermined threshold value. In this manner rapid pressure lowering is accomplished in case of a so-called negative $\mu$ jump (leap in coefficient of friction).

As explained above, in accordance with the basic algorithm of the invention, the pressure reduction period in the control cycle currently under way results as a product of two factors, the second factor being a quotient which has in its denominator the maximum re-acceleration of the wheel measured in the preceding control cycle. In the numerator of the quotient there is a value which is fixedly given according to a most simple embodiment of the invention. According to a preferred further development of the invention the given value is varied as a function of the reduction in speed of the wheel during the preceding control cycle. If, in the preceding control cycle, there was only little decrease in speed after pressure reduction had begun that is an indication that the curve of coefficient of friction/slip continues to rise (e.g. deep snow) so that the decreases in pressure (i.e. pressure reduction periods) should be relatively small. If the decrease in velocity measured in the preceding control cycle is small, therefore, the given value used in the numerator of the quotient is kept relatively small in order to achieve a brief pressure reduction period.

When the pressure reduction period calculated according to the invention for the control cycle currently under way has expired, the pressure reduction is interrupted and the brake pressure at the brake of the wheel concerned is kept constant for the time being. According to a preferred embodiment of the invention the pressure reduction is continued when the wheel circumference speed has diminished by a certain amount of e.g. 2 to 10 km/h since termination of the preceding pressure reduction. Of course, that applies only if the wheel is not yet in a condition where the threat of locking is imminent. In other words: when the wheel gets into a state of impending locking (found out conventionally by measuring the deceleration and/or slip and comparing it with threshold values) keeping the pressure constant is interrupted at once and the reduction of the pressure is continued. The pressure is not maintained constant when there is a tendency of locking.

According to another modification of the method according to the invention, on the other hand, the pressure reduction is terminated at once if the braked wheel experiences re-acceleration greater than a predetermined threshold value during the instantaneous control cycle prior to the end of the pressure reduction period.

A further refinement of the method according to the invention takes into account that the maximum re-acceleration of the braked wheel measured in the preceding control cycle does not mean much for the renewed calculation of the pressure reduction period if the so-called control deviation (pressure variation p during the control cycle) was very small in the preceding control cycle. In that event, therefore, the pressure reduction period in the instantaneous control cycle is equalled to the pressure reduction period of the preceding control cycle, and the above modifications provided under special circumstances to the pressure reduction period are applicable as well.

The algorithms described above for control of the brake pressure in an ABS brake system are implemented by software in line with present day technology, i.e. by the programming of a processor. Those skilled in the art nowadays are familiar also with the means by which to measure and process the various control parameters.

BRIEF DESCRIPTION OF THE DRAWINGS

An embodiment of the invention will be described further with reference to the drawing, in which:

FIGS. 1a, 1b, and 1c diagrammatically show the course of the circumferential speed of a braked wheel, with the pressure reduction period once being set too long, once too short, and one correctly, plotted above a common time scale, including the corresponding courses of the wheel acceleration $a_{rad}$ and the corresponding courses of the brake pressure $p_{rad}$ at the braked wheel.

DESCRIPTION OF THE PREFERRED EMBODIMENT

In FIG. 1 three functions are plotted above a common time scale (abscissa). FIG. 1a shows the course of the circumferential speed $v_{Rad}$ of a braked wheel and the per se known reference speed $v_{Ref}$. FIG. 1b shows the course of the acceleration of the wheel, including a desired theoretical value, above the same time scale, and FIG. 1c shows the corresponding course of the brake pressure, again above the same time scale.

As designated in FIG. 1a, the pressure reduction period is too long at the first minimum of the wheel circumference speed; the pressure is reduced too much. Accordingly, in FIG. 1b the re-acceleration of the wheel reaches a relatively high maximum value I which is clearly above the theoretical value S.

The next minimum of the wheel circumference speed $v_{Rad}$ in FIG. 1a corresponds to a pressure reduction period which is too short, i.e. insufficient pressure reduction. Accordingly, the re-acceleration reaches a relatively flat maximum II which lies below the theoretical value S.

It is only at the minimum shown at the far right in FIG. 1a of the wheel circumference speed $v_{Rad}$ that the pressure reduction period and, therefore, also the lowering of the pressure are correct so that the maximum III of the re-acceleration curve coincides with the theoretical value S (FIG. 1b).

It becomes clear from FIG. 1 that the re-acceleration measured in a control cycle permits an observation to be made as to whether the pressure reduction period was too short or too long.

Figure 2B:
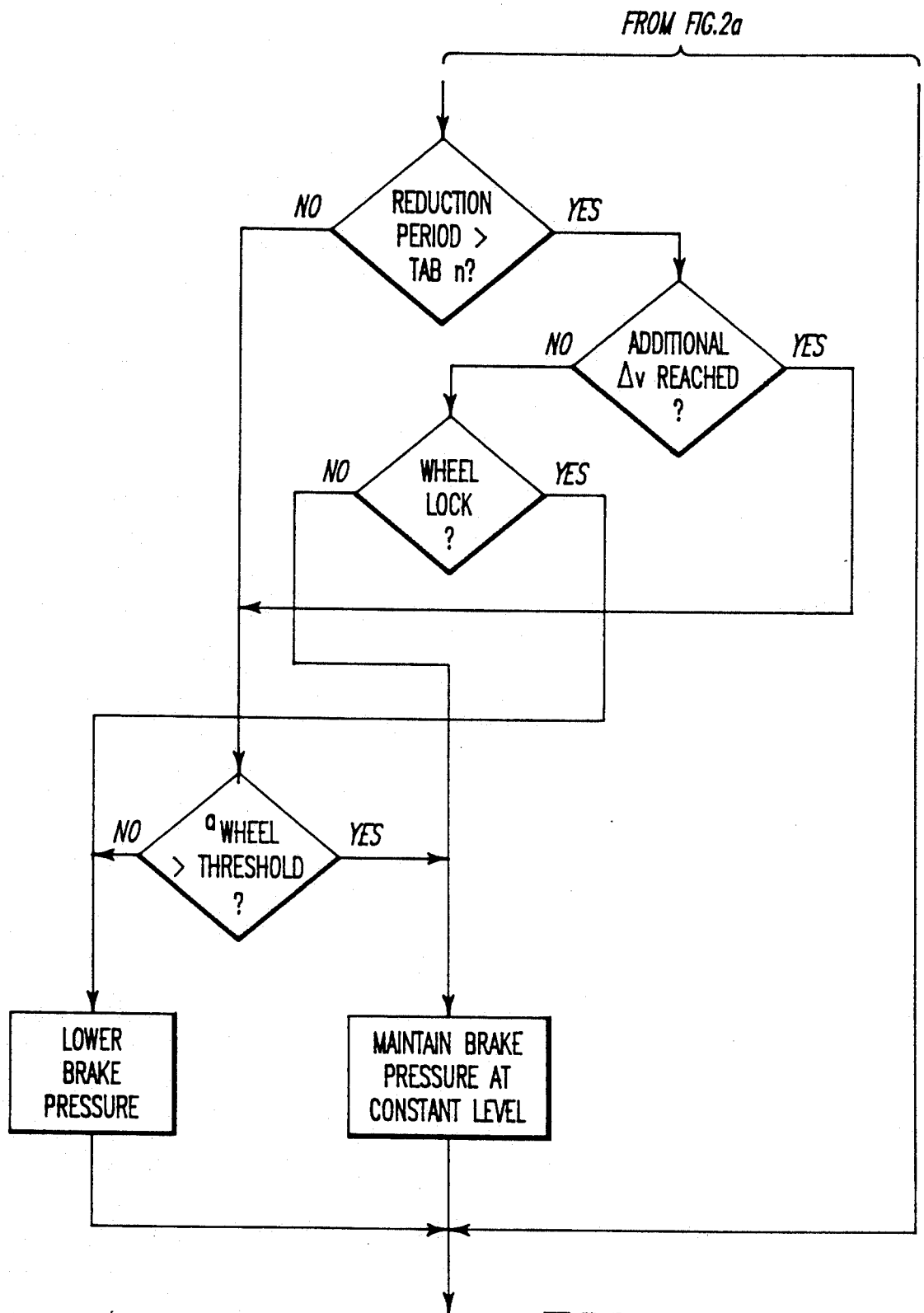
FIGS. 2a and 2b are flowcharts of a braking algorithm according to the invention.
Figure 2A:
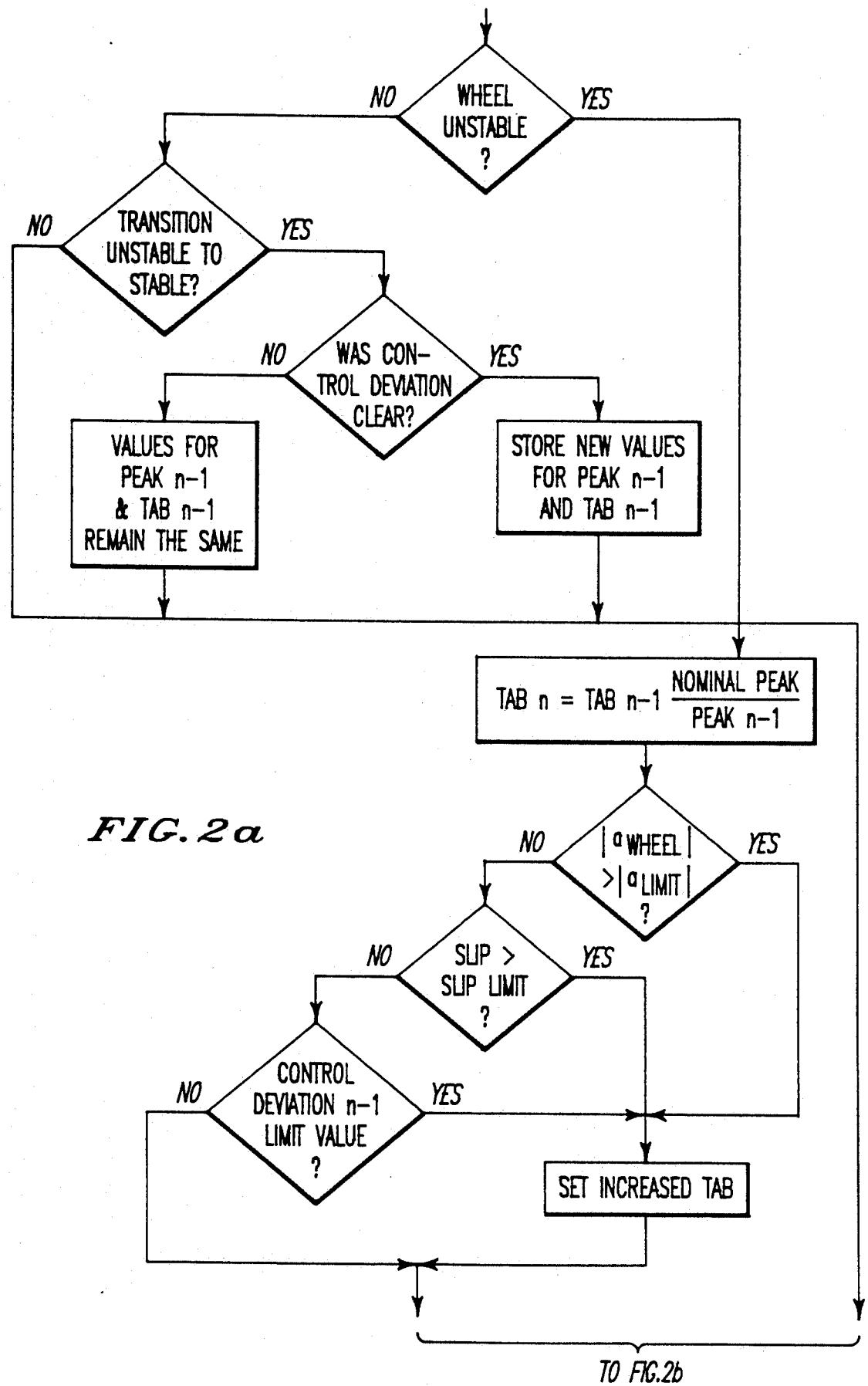

FIGS. 2a and 2b present a flowchart according to which the braking algorithm described above can be implemented.

What is claimed is:

1. In an anti-lock vehicle brake system wherein the rotational behavior of a braked wheel is measured and, if a risk of locking exists, the brake pressure is decreased and then increased in a series of successive control cycles, a method of establishing the pressure reduction period $t^n_{ab}$ of a current control cycle (n) and controlling the anti-lock vehicle brake system thereby, comprising the steps of:

storing the pressure reduction period ($t^{n-1}_{ab}$) for the immediately preceding control cycle, establishing a first factor corresponding to said pressure reduction period, storing the maximum reacceleration (peak$_{n-1}$) of said wheel in the immediately preceding control cycle, establishing a second factor corresponding to said maximum reacceleration, determining the pressure reduction period for said current cycle by mathematically combining said first and second factors, and controlling the anti-lock vehicle brake system to lower the brake pressure on said wheel during said determined pressure reduction period.

2. The method as claimed in claim 1, characterized in that the first factor is the pressure reduction period ($t^{n-1}_{ab}$) in the preceding control cycle.

3. The method as claimed in claim 1, characterized in that the second factor depends on a quotient of a predetermined value (peak-soll) and the maximum re-acceleration (peak$_{n-1}$) of the wheel measured in the preceding control cycle (n−1).

4. The method as claimed in claim 1, characterized in that the pressure reduction period ($t^n_{ab}$) of a control cycle (n) currently under way is extended if the deceleration of the wheel become greater than predetermined threshold values.

5. The method as claimed in claim 3, further comprising the step:

measuring a speed reduction of the wheel in the preceding control cycle (n−1); and wherein, the predetermined value (peak-soll) is a function of the measured speed reduction of the wheel in the preceding control cycle (n−1).

6. The method as claimed in claim 1, characterized in that subsequent to a pressure reduction period ($t_{ab}$) the brake pressure is maintained constant in the current control cycle (n) and thereupon the brake pressure reduction is continued if the circumferential speed of the wheel has diminished by a predetermined value since the end of the pressure reduction period ($t_{ab}$).

7. The method as claimed in claim 1, characterized in that the brake pressure reduction is terminated at once if the braked wheel experiences re-acceleration greater than a predetermined threshold value during the control cycle (n) currently under way, prior to the end of the pressure reduction period ($t^n_{ab}$).

8. The method as claimed in claim 1, characterized in that the pressure reduction period ($t^n_{ab}$) of the control cycle (n) currently under way is adjusted to equal the pressure reduction period ($t^{n-1}_{ab}$) of the preceding control cycle (n−1) if the control deviation in the preceding control cycle (n−1) was less than a predetermined comparative value.

* * * * *